UNITED STATES PATENT OFFICE.

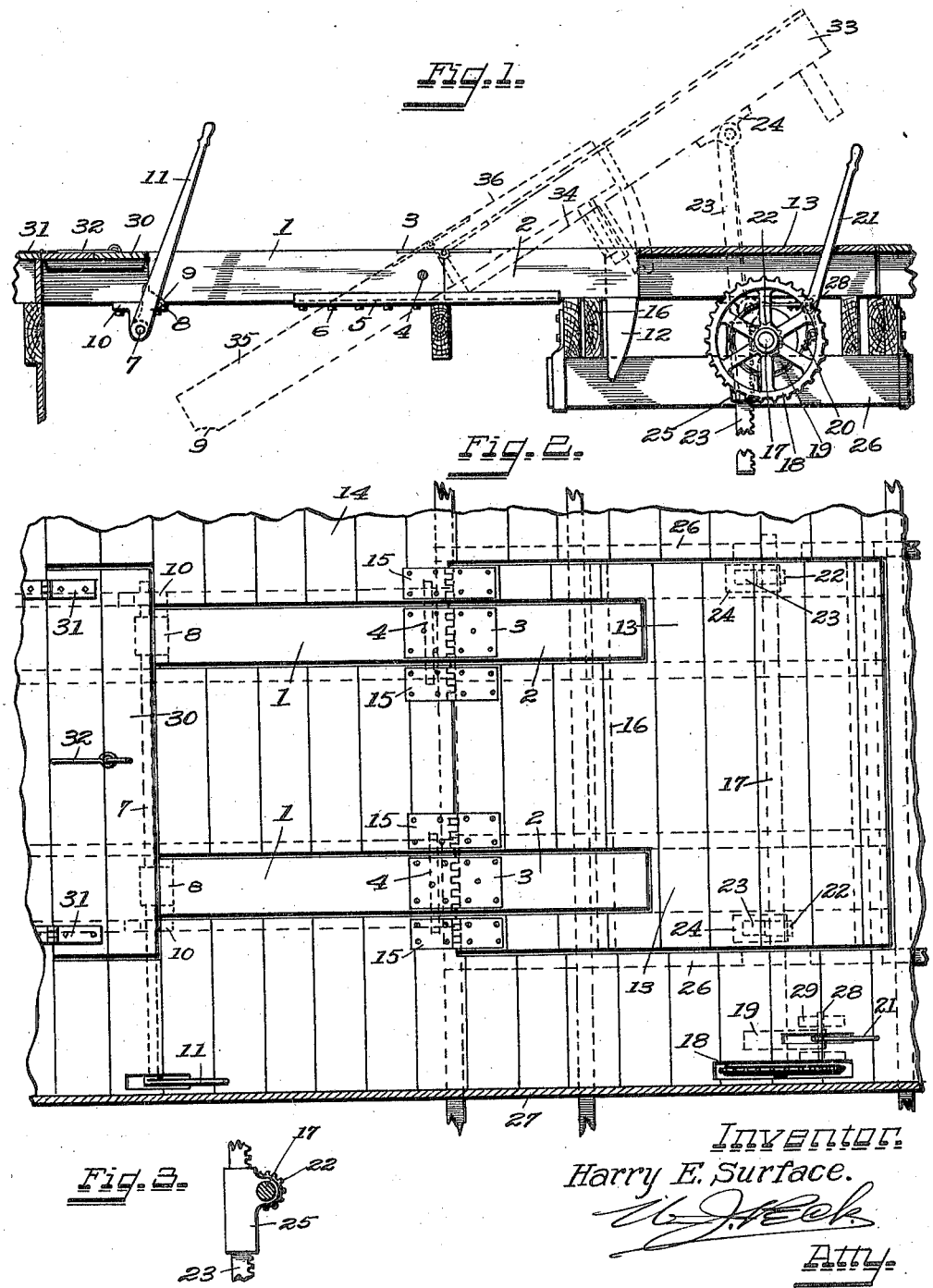

HARRY E. SURFACE, OF BLOOMINGTON, ILLINOIS.

WAGON-DUMP.

1,393,464.                Specification of Letters Patent.        Patented Oct. 11, 1921.

Application filed September 13, 1920. Serial No. 409,956.

*To all whom it may concern:*

Be it known that I, HARRY E. SURFACE, a citizen of the United States, and a resident of Bloomington, in the county of McLean and State of Illinois, have invented certain new and useful Improvements in Wagon-Dumps, of which the following is a full, clear, and exact description, reference being had to the accompanying drawing, forming part of this specification.

My invention relates to means for tipping vehicles of various kinds so that their loads may be discharged either to a sink or hopper.

One object of my invention is to combine the ordinary gravity operated dump logs with power operated means for performing the dumping operation.

Another object of my invention is to provide means whereby a platform which includes a portion of the dump logs may be power elevated to perform the dumping operation to the end that motor trucks and sleds may be dumped.

Other objects of my invention will appear and be described in the specification.

The novelty of my invention will be hereinafter more fully set forth and specifically pointed out in the claims.

In the accompanying drawing:

Figure 1 is a sectional side elevation of an apparatus embodying my invention.

Fig. 2 is a plan view of Fig. 1.

Fig. 3 is a detail of a portion of the power elevating mechanism.

The same numerals of reference are used to indicate identical parts in all the figures.

In the embodiment of my invention shown in the drawing I employ a pair of dump logs each of which comprises two sections 1 and 2, the two sections being hinged together as by hinges 3 and mounted on a pivot 4, section 1 being provided with a channel iron or other brace 5 which is secured to it as by lag screws 6 and extends a considerable distance under the sections 2, the construction being such that when section 1 descends on the pivot 4, section 2 is raised through its contact with the channel iron 5.

A shaft 7 is provided adjacent the free end of the sections 1 and this shaft carries a pair of dogs 8 which engage radially formed portions 9 of the under side of the sections 1, the shaft 7 being mounted in bearings 10 carried by stationary parts of the structure and being adapted to be rocked by the lever 11, the construction being such that when the lever 11 is moved to the left of the position shown in Fig. 1, the dogs 8 are withdrawn from under the ends of the sections 1 thereby releasing the dump logs.

The free ends of the sections 2 of the dump logs carry guards 12 which, when the dump logs are operated prevent the horses' feet from slipping into the opening left by the raising of the sections 2 of the dump logs.

A platform 13 surrounds the sections 2 of the dump logs and extends beyond their ends and is hinged to the floor 14 of the driveway as by hinges 15, shown more clearly in Fig. 2, the platform 13 carrying a cross beam 16 which, when the platform is raised, carries upward the sections 2 of the dump logs, the pivotal point of the hinges 15 and the hinges 3 being in line when the dump logs are in the position shown in full lines in Fig. 1.

To elevate the platform 13 I provide a shaft 17 which may be power operated through the sprocket 18, and which carries any suitable brake drum 19 around which a band brake 20 is mounted, the brake being operated by the lever 21. The shaft 17 also carries a plurality of pinions 22 which engage racks 23 which are attached as by brackets 24, to the platform 13, the racks traveling through oscillating guides 25 which are loosely mounted on the shaft 17 and embrace the racks 23 to maintain the latter in proper mesh with the pinions 22.

Any suitable combined hand and power apparatus may be used to drive the chain which passes over the sprocket 18, such combined hand and power device being in common use where machinery for dumping loads is employed.

The shaft 17 is preferably mounted on beams 26 which form a part of the permanent structure.

As shown in Fig. 2 the levers 11 and 21 are preferably mounted to one side of the driveway adjacent one of the walls of the building which is indicated at 27, the sprocket 18 being also mounted to one side of the driveway, suitable openings being provided through the driveway for the passage of the drive chain and for the operation of the levers, the brake lever 21 being mounted on a pivot 28 which may be supported by blocks 29 shown more clearly by the dotted lines of Fig. 2, the construction being such that when the lever is moved in one direction the brake is applied, the brake being released upon movement of the lever in the opposite direction. Any suitable trap door 30 may be hinged as by hinges 31 and provided with a prop 32 so that it may be turned back and held in an angle position thus affording an opening through which the load of the vehicle may be discharged.

When it is desired to dump a motor truck or sled which, on account of its structure may not be dumped in the same manner as an ordinary wagon, that is by the use of the dump logs 1 and 2, the vehicle is placed so that it will discharge its load through the trap door 30 and the power elevating device is operated to raise the front end of the vehicle, the lever 11 and sections 1 of the dump logs remain in the position shown in Fig. 1, the platform 13 assuming the dotted position 33 of Fig. 1, the sections 2 of the dump logs assuming the dotted position 34, the brake mechanism being employed to hold the platform 13 elevated until such time as it is desired to lower it whereupon the brake mechanism may be used to control the speed of lowering of the platform.

When the sections 1 and 2 of the dump logs are employed in the manner that dump logs are usually operated, sections 1 assume the dotted position 35 while the sections 2 assume the dotted position 36.

It is to be observed that an apparatus constructed as herein described may be employed to dump loads from a vehicle of any width of track or any length of wheel base including not only wheeled vehicles but those in the nature of sleds or drags, the arrangement being such that if the vehicle is either too wide or too narrow for the sections 1 and 2 of the dump logs, it will rest upon the platform 13 and the front end thereof may be elevated whereas with the ordinary dump logs it would be necessary to remove the load in some other manner such as by shoveling it out.

Having thus fully described my invention, I claim:

1. In a wagon dump the combination of a sectional dump log, a hinge connection between the sections thereof, means for raising one section of the dump log when the other section is lowered, and means for raising one section of the dump log independently of the movement of the other section.

2. In a wagon dump the combination of a pivotally mounted sectional dump log, means for raising one section of the dump log when the other section is lowered, and power operated means for raising one section of the dump log independently of the movement of the other section.

3. In a wagon dump the combination of a sectional dump log, a hinge connecting the sections of the dump log, a brace carried by one section and coöperating with the other section when the first section is moved, and means for moving the other section of the dump log independently of the movement of the first mentioned section.

4. In a wagon dump the combination of a sectional dump log, a hinge connecting the sections of the dump log, a brace carried by one section and coöperating with the other section when the first section is moved, and power operated means for moving the other section of the dump logs independently of the movement of the first mentioned section.

5. In a wagon dump the combination of a pivotally mounted sectional dump log, a hinge connection between the sections, a brace carried by one section and coöperating with the other whereby when the first mentioned section is moved the other section moves with it, a platform, means for raising the platform, and means coöperating between the platform and one section of the dump log whereby when the platform is moved, one section of the dump log moves with it.

6. In a wagon dump the combination of a pair of sectional pivotally mounted dump logs, hinges for connecting the sections and adjacent the pivotal mounting of the dump logs, a platform hingedly mounted in line with the hinges between the sections of the dump logs when in normal position, means for moving the platform, and means coöperating between the platform and one section of each dump log whereby when the platform is moved one section of each dump log will move with it.

HARRY E. SURFACE.